Jan. 5, 1943.     H. JOACHIM ET AL     2,307,509
MEANS FOR MIXING DISTRIBUTING FLUIDS
Filed March 24, 1941
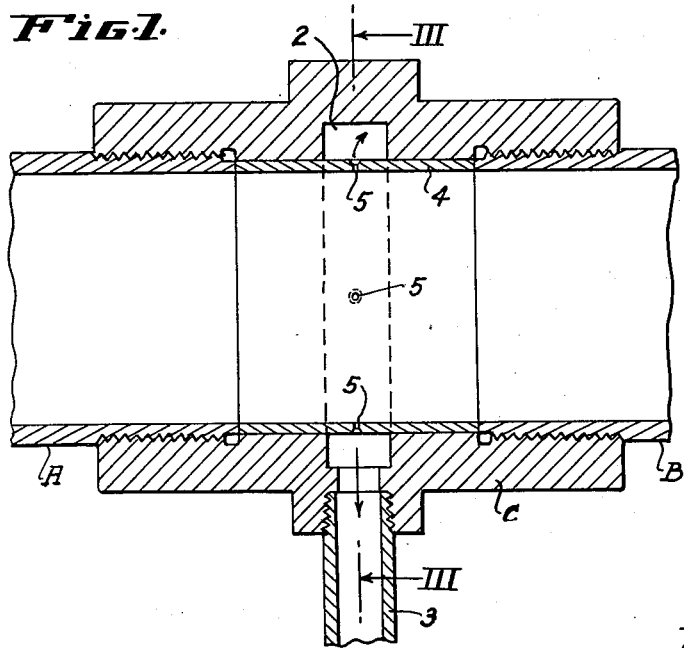
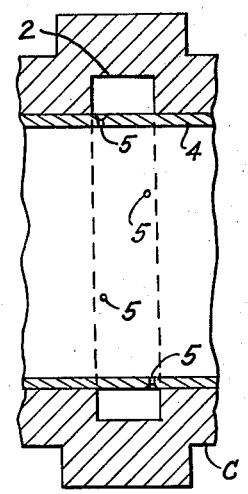
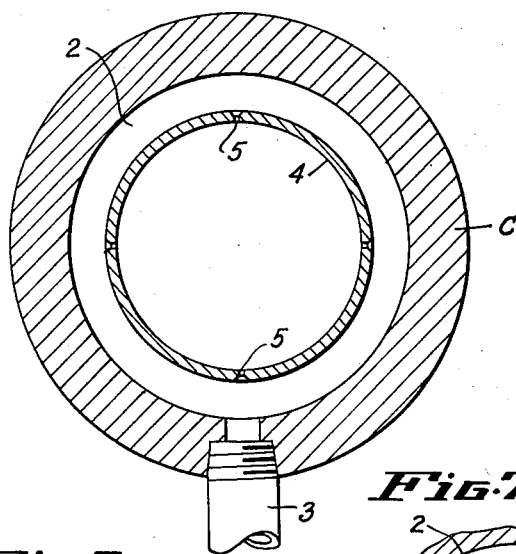
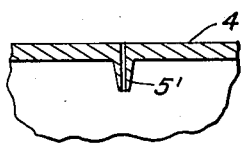
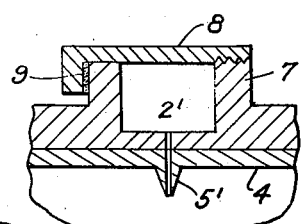
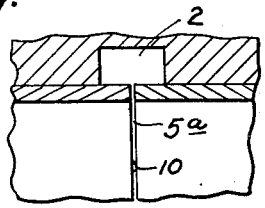
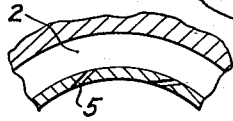
INVENTOR.
HANS JOACHIM
LEONARD B. BURTON
By Chas. E. Townsend
ATTORNEY.

Patented Jan. 5, 1943

2,307,509

UNITED STATES PATENT OFFICE 2,307,509

MEANS FOR MIXING AND DISTRIBUTING FLUIDS

Hans Joachim, Walnut Creek, and Leonard B. Burton, Santa Rosa, Calif., assignors of one-third to Carl S. Plaut, San Francisco, Calif.

Application March 24, 1941, Serial No. 384,916

1 Claim. (Cl. 259—4)

This invention relates to the mixing and distributing of fluids, either liquid or semi-liquid, particularly where it is desired to inject a very small measured quantity of one liquid into another and where at the same time complete diffusion and mixture is essential.

It is recognized that the success of any process where the combination of two or more liquids or slurries takes place is dependent upon the accurate proportioning of the solutions or slurries at a point in the process.

To this end, there have been designed numerous types of excellent proportioning pumps and devices operating either at a fixed rate of flow or in proportion to the flow of solution or liquid in the line. These devices operate at pressures ranging from a few pounds up to more than a thousand pounds per square inch and some are so accurate that it is possible to proportion as little as a quart of liquid evenly over a twenty-four hour period.

However, no account is taken of the distribution of any proportioned material after it has been introduced into the main line. It is assumed that turbulence, due to flow and pressure, and kinetic action, will be sufficient to distribute evenly a solution or slurry into a main body of liquid.

This supposition is not often the case. Take for example the introduction of very minute quantities of treating chemicals into domestic water supplies. It can be shown that the dosage varies from ten to fifty per cent in samples collected at the same point after treatment, although the line flow is constant and the proportioning device feeds a uniform solution at a constant rate.

What apparently happens is that the main flow channels inside the line and that proportioning to a single point does not completely answer the problem of distribution.

To remedy the lack of proper distribution, due to channeling and other causes including differences in density, we have developed a method and means for use as an accessory to any pressure-type proportioning device, the principle of which is at once simple and flexible.

Briefly, the invention resides in injecting definite proportions of a liquid, which may be termed the additive liquid or chemical, into a main current flow in such a manner that the additive liquid penetrates sufficiently into the main flow as to become thoroughly mixed therewith.

To this end, we employ a conduit section, preferably cylindrical and acting as a coupling in a pipe line, and providing this coupling with suitable means by which a series of streams or sprays of proportioned liquid may be injected circumferentially around the stream flow through the conduit and coupling, so that no part of the main flow can escape contact with the minute streams piercing it from multiple jets.

Having reference to the accompanying drawing:

Fig. 1 is a cross section of one type of apparatus suitable for carrying out the invention.

Fig. 2 illustrates a modification.

Fig. 3 is a section on the line III—III of Fig. 1.

Fig. 4 illustrates a modification of the penetrating nozzle.

Fig. 5 illustrates a modified form of construction.

Fig. 6 illustrates a further modification.

Fig. 7 illustrates an arrangement of inclined jets or perforations by which the additive liquid may be introduced tangentially and so create or tend to develop a rotative or rifling motion to the liquid in the main line.

A and B represents two sections of a conduit representing the vehicle for the main flow of the body of liquid to which an additive liquid, slurry or compound is to be supplied. C represents a coupling member joining the two conduit sections A and B constituting an essential part of our distributing system.

In Fig. 1 this coupling member C is shown as provided with an annular channel or manifold 2, connected with a suitable source of supply for an additive fluid by means of the pipe 3. In continuation with the conduit sections A and B and fitting snugly within the coupling member C is a metal tubing 4, bridging and enclosing the manifold 2 except for a series of very fine needle-like perforations 5. These perforations may be in the same plane, as shown in Fig. 1; or staggered, as shown in Fig. 2; or they may terminate in fine attenuated bosses or nozzle-like, radial projections 5', as shown in Figs. 4 and 5; or inclined for tangential discharge, as in Fig. 7; or these perforations may be continuous in the form of a thin narrow disk-like slots 5ª, as shown in Fig. 6, extending entirely around and in continuous open communication with the manifold.

In Fig. 5 there is a modification of the coupling member where the manifold 2' consists of channels on the outside of the coupling member, lying between two annular flanges 7 and suitably closed and covered by an outside gland-like screw cap 8; packing 9 serving to provide a tight joint.

Where a nozzle type of injecting means is used, as shown in Figs. 4 and 5, these nozzles may be of any desired length suitably proportioned to the size of the conduit. For instance, with the conduit about one and three-quarters (1¾) inches inside diameter, these nozzles might be of a length up to three-quarters (¾) of an inch. Nozzles are preferable where miscible solutions are to be injected as necessary to penetrate the perimeter of the current flow and converge hub-like to a point as near the center of the flow as possible.

Where nozzles like the perforated bosses 5' are employed (Figs. 4 and 5) distribution is enhanced by the fact that these radial projections operate to break up the main flow and set up eddying currents which, in turn, pick up and break the incoming additive and more completely effect diffusion and admixture.

Slurries or undissolved particles are best distributed when they are injected to form a spray at right angles or at an oblique to the main flow, as shown by the construction of Fig. 1, 2, 3 or 6.

In Fig. 6 a thin, sheet-like spray is formed by using two sections of tubing 4, suitably held apart by means such as is represented by the bosses 10.

Liquids of high viscosity or density are preferably injected at a tangent, as illustrated in Fig. 7, to develop a rotation of liquid in the main line. The proportions of the additive liquid to the main flow depend on several factors, including the volume of the main flow and its velocity, the size of the perforations 5, 5' or 5ª, and the pressure on the additive.

The many uses of this method and apparatus include the following:

(a) Introducing treating chemicals into water supplies both domestic and industrial;

(b) Blending of solutions in food and beverage manufacture;

(c) Introduction of process chemicals in chemical manufacture;

(d) Introducing makeup into chemical solution tanks;

(e) Proportioning reagents in the flotation of metallic and non-metallic ore flotation;

(f) The addition of blends and reagents in the manufacture of petroleum products; and (g) The introduction of soluble gases into liquids.

What we claim is:

Means for mixing two fluids which comprises, in combination with two aligned separated conduit sections and a coupling member joining the two conduit sections, a tubular sleeve between and in continuation of the two conduit sections and housed within said coupling member, said coupling member having a circumferential manifold surrounding said sleeve and connected to a source of fluid supply, said manifold being exteriorly around the coupling, and a cap to close and form the outer wall of said manifold, said sleeve having a multiplicity of small circumferentially arranged outlet ports opening into the interior of the conduit passage through which fluid may pass from the manifold into the main flow.

HANS JOACHIM.
LEONARD B. BURTON.